Sept. 2, 1941.  W. J. MATTOX  2,254,539
FLUID PUMP
Filed May 18, 1939

Inventor:
William J. Mattox
By Lee J. Gary
Attorney

Patented Sept. 2, 1941

2,254,539

UNITED STATES PATENT OFFICE 2,254,539

FLUID PUMP

William J. Mattox, Chicago, Ill., assignor to Universal Oil Products Company, Chicago, Ill., a corporation of Delaware Application May 18, 1939, Serial No. 274,363

4 Claims. (Cl. 103—165)

The invention provides an improved form of pump capable of delivering accurately and variably controlled small quantities of liquids at constant rates against substantial superatmospheric pressure.

This improved form of pump is of the surge type having inlet and outlet valves remote from the pumping cylinder and communicating therewith through a surge line and is capable of pumping either hot or cold fluids. It is particularly well adapted to handling relatively small accurately controlled quantities of fluid and finds its greatest utility in small scale or laboratory work or for injecting small quantities of reagents, catalytic material or the like into a pressure zone.

The displacement mechanism of the pump, which replaces the conventional cylinder and piston, comprises a bellows which, upon expansion, draws in regulated quantities of fluid from the surge line and, upon compression, discharges said liquid through the surge line, the surging liquid effecting movement of the fluid to be pumped through the inlet and discharge valves with which the surge line communicates.

The means provided for compressing the bellows comprises a cam driven by a prime mover and actuating a lever equipped with a stroke regulator, said cam and lever serving to convert rotary motion of the prime mover to straight line reciprocating motion for compressing the bellows. Upon recession of the cam and lever from their bellows-compressing position, the bellows is expanded by means of a spring.

An important feature of the invention resides in the provision of a rigid metallic sleeve or housing for the bellows, whereby the relatively thin ductil body of the latter is prevented from bulging or rupturing under pressure.

Another feature of the invention is the provision for varying the stroke of the lever arm, whereby to vary the degree of expansion and contraction of the bellows and its consequent displacement. This lever arm is preferably a metal bar hingedly secured at its fulcrum end to a stationary member of the pump and provided at its opposite end with an adjustable set screw which contacts a stop on a stationary portion of the pump. By simple adjustment of the set screw, the lever can be made to follow the cam on all or any desired portion of the return or suction stroke so that, upon the discharge stroke, all or only a portion of the eccentric motion of the cam is effective.

Another important feature of the invention is the simple supporting structure and arrangement of the various component parts of the pump which make it a compact and easily constructed unit.

One specific embodiment of the pumping mechanism provided by the invention comprises, in combination, an expansible and compressible member, such as a cylinder bellows, housed within a rigid, close fitting sleeve, said member being provided with an inlet and discharge port at one end thereof, a surge line communicating with said port, inlet and discharge valves communicating with the surge line, a spring communicating with the opposite end of said member to effect expansion of the latter, a lever communicating with said opposite end of said member to compress the same, a cam driven by a prime mover and adapted to move said lever, and a set screw movably engaging said lever and acting as an adjustable stop to vary the stroke of said lever and thereby regulate the degree of expansion and compression of said member.

The accompanying drawing, illustrates on specific form of apparatus embodying the features of the invention.

Figure 1:
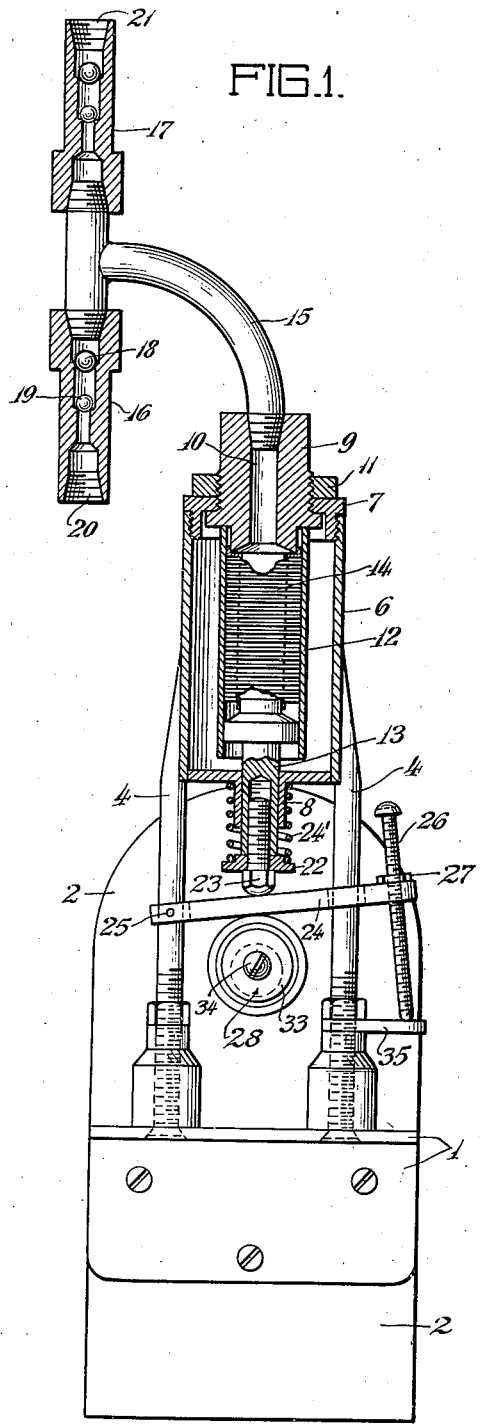
Fig. 1 is an elevational view of the apparatus shown partially in cross-section.
Figure 2:
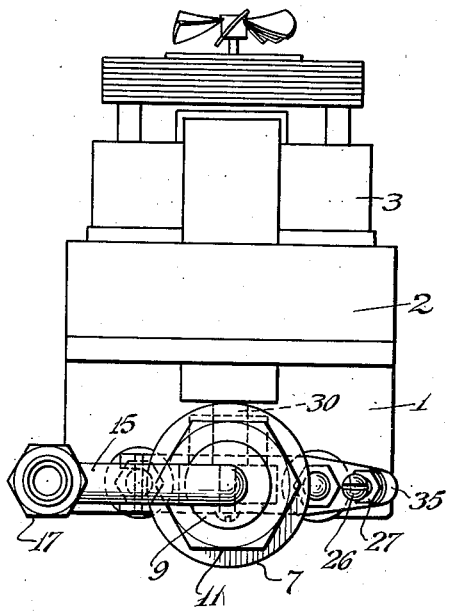
Fig. 2 is a plan view of the same apparatus.

Referring to the drawing, the reference numeral 1 indicates an angle member which serves as a base plate for the pump and is attached to the housing 2 of a suitable gear reducer driven by a prime mover which, in the particular case here illustrated, is an electric motor of the synchronous type.

Legs 4, attached to base plate 1, extend upwardly therefrom and support a cylindrical member 6, the upper end of which is internally threaded to receive a bushing 7 and the lower end of which is closed and provided with a guide sleeve or bearing 8.

A bushing 9, provided with port 10, is threaded to member 7 and held in place by lock-nut 11. The bushing is also provided with a depending cylindrical sleeve 12 which may be integral with the bushing or attached thereto by threading, welding, soldering or in any other suitable manner. The lower end of sleeve 12 is open and receives the upper portion of a reciprocating member 13 which is fitted to slide within the sleeve. A lower portion or shank of member 13 is fitted to and slides within the sleeve or bearing 8.

A resilient, compressible and expansible metallic member such as bellows 14 is provided within sleeve 12 and is attached at its open upper end to the walls of sleeve 12 or to bushing 9 by brazing, soldering or in any other suitable manner. The lower end of bellows 14 is attached to the upper end of reciprocating member 13 so that movement of the latter serves to compress and expand the bellows.

One end of surge line 15 is threaded into bushing 9 at the end of port 10 and the opposite end of the surge line is T-shaped and threaded to receive the inlet valve block 16 and the outlet valve block 17, each of which, in the particular case here illustrated, is provided with balls 18 and 19 resting on and ground to seat against shoulders provided within the valve blocks.

A suitable fluid, which in the preferred embodiment of the invention is a relatively non-compressible liquid such as hydrocarbon oil, water, glycerin or the like and which may, when desired, be immiscible with the fluid to be pumped, is provided within bellows 14 and, upon expansion and contraction of the latter, surges back and forth through line 15. Thus the fluid to be pumped is drawn through an inlet line, not shown, communicating with port 20 of valve block 16, past the ball-check valves into the surge line upon expansion of the bellows and, upon compression of the bellows, the indrawn fluid is discharged from the surge line through block 17 past the ball-check valves therein to a suitable discharge line, not shown, communicating with port 21 of this valve block.

Preferably, the fluid capacity of port 10 and that portion of the surge line, excluding the T-shaped end thereof, is somewhat greater than the full displacement capacity of bellows 14 and the quantity of surging liquid employed is such that the fluid being pumped is drawn only partway back into the surge line past the T-shaped portion thereof on the intake stroke and such that the surging liquid does not enter the T-shaped portion of line 15 and commingle with the stream of fluid passing therethrough upon the discharge stroke.

A washer or retaining member 22 is provided at the lower end of reciprocating member 13 and, in the particular case here illustrated, is bolted thereto by means of cap screw 23, and a helical spring 24' bearing against the closed bottom of member 6 and washer 22 urges member 13 downward and serves to expand the bellows.

Cap screw 23 bears against a rocker arm 24 which is pivoted at 25 on one of legs 4 and moves upwardly and downwardly through the arc of a circle upon rotation of cam 28 which, in turn, is driven at the desired rate of speed through gear reducer 2 by motor 3.

Figure 3:
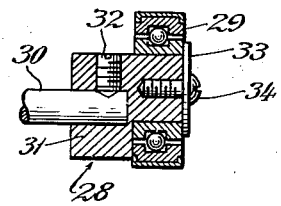
Fig. 3 is a cross-sectional detail view of the cam which is designated by the reference numeral 28 in Fig. 1.

As shown in Fig. 3, cam 28 preferably comprises a ball race 29 mounted eccentric to shaft 30 of speed reducer 2 by means of member 31 which is secured to shaft 30 by means of set screw 32 and of which the ball race is attached by means of washer 33 and bolt 34, although any other suitable type of cam may be employed.

The end of rocker arm 24, opposite pivot 25, is provided with an adjustable set screw 26 and lock-nut 27. The set screw, in cooperation with member 35 provided on one of the legs 4, acts as a stop for the rocker arm on its downward stroke, to regulate the displacement of bellows 14 and permit variation of the feed rate of the pump, per stroke, from substantially the maximum displacement of bellows 14 to a displacement closely approaching zero. This adjustment is accomplished by simply turning set screw 26 to the required position. With the set screw retracted to a position at which it does not bear against member 35 on the downward stroke, the rocker arm urged by spring 24' will follow cam 28 through its entire path of travel and the maximum feed rate will be obtained. With set screw 26 adjusted to bear against member 35 at any point short of the extreme downward position of cam 28, bellows 14 will remain unexpanded by a corresponding amount upon the downward stroke of the cam and the throw of the cam will not become effective until it again meets the rocker arm on the upward stroke, whereby the feed rate of the pump is correspondingly reduced.

It is, of course, within the scope of the invention to vary specific details of the construction herein illustrated and obviously, when not required, the gear reducer may be eliminated. Also, other types of prime movers may be employed within the scope of the invention. The invention also specifically contemplates the use of a plurality of pumps, such as herein provided, driven from a common cam shaft with the stroke of the individual pumps synchronized to give a more uniform flow of fluid through the inlet and discharge lines, which are manifolded to the valve blocks provided for the bellows of each pump, than is obtainable with a single cylinder pump. This arrangement also offers a means of multiplying the capacity of the pump without altering the size of the individual pumping units.

I claim as my invention:

1. An apparatus of the class described comprising, in combination, an expansible and contractible cylindrical metal bellows, a liquid piston in said bellows, a rigid cylindrical member enclosing said bellows and fitted thereto, a reciprocating member slidably mounted within said cylindrical member, one end of said bellows being open and secured to said rigid cylindrical member and the opposite end being closed by and secured to said reciprocating member, a surge line, a closure for the upper end of said bellows having a port provided therein which communicates with the space within the bellows and with inlet and outlet valves through said surge line and means including a prime mover and adjustable-stroke linkage between the prime mover and said reciprocating member for compressing and expanding the latter.

2. An apparatus of the class described comprising, in combination, an expansible and contractible cylindrical metal bellows, a liquid piston in said bellows, a rigid cylindrical member enclosing said bellows and fitted thereto, a reciprocating member one end of said bellows being open and secured to said rigid cylindrical member and the opposite end being closed and attached to said reciprocating member having a portion disposed within and slidably fitted to the walls of said rigid cylindrical member, a closure for the open end of said bellows having a port provided therein which communicates with the space within the bellows, inlet and outlet valves communicating with said port through a surge line, the fluid capacity of said port and said surge line being somewhat greater than the full displacement capacity of said bellows, and means for effecting movement of said reciprocating member to expand and contract the bellows.

3. An apparatus of the class described comprising, in combination, an expansible and contractible cylindrical metal bellows, a liquid piston in said bellows, a rigid cylindrical member enclosing said bellows and fitted thereto, a reciprocating member, one end of said bellows being open and secured to said rigid cylindrical member and the opposite end being closed and attached to said reciprocating member having a portion disposed within and slidably fitted to the walls of said rigid cylindrical member, a closure for the open end of said bellows having a port provided therein which communicates with the space within the bellows, inlet and outlet valves communicating with said port through a surge line, tension means associated with said reciprocating member to urge the same outwardly from said rigid cylindrical member and expand the bellows, and means for moving the reciprocating member inwardly of said rigid cylindrical member to compress the bellows.

4. An apparatus of the class described comprising, in combination, supporting means including two upright legs secured to a base plate, a rigid cylindrical member attached to and depending from said supporting means, an expansible and contractible cylindrical bellows disposed within said rigid cylindrical member, the latter being closely fitted to the outer side walls of the bellows, a liquid piston in said bellows, a closure member for the upper end of said rigid cylindrical member and forming a portion of said supporting means, said closure member being provided with a port communicating through the open upper end of said bellows with the space provided therein, the upper end of said bellows being retained in fixed relation to the rigid cylindrical member and closure member and the lower end being movable within the rigid cylindrical member, inlet and outlet valves communicating with said port through a surge line, a reciprocating member having an upper portion slidably disposed within the lower portion of said rigid cylindrical member and secured to the lower closed end of said bellows, a spring disposed between and bearing against a portion of said supporting means and the lower end of said reciprocating member to urge the latter downwardly and expand the bellows, a prime mover operatively connected through a gear reducer to a cam disposed beneath said reciprocating member, and a lever pivoted at one end to one of said legs of the supporting structure and adapted to serve as linkage between the cam and reciprocating member to move the latter upwardly and compress the bellows upon the upward stroke of said cam.

WILLIAM J. MATTOX.